Feb. 3, 1931.   J. C. PEARSON ET AL   1,791,426
PROCESS AND APPARATUS FOR CONTINUOUSLY SEPARATING
GRANULAR AND PULVERULENT MATERIALS
Filed Sept. 8, 1928   2 Sheets-Sheet 1

Inventors
Joseph C. Pearson
Frank A. Hitchcock
By G. C. Waldrop.
Attorney

Feb. 3, 1931.  J. C. PEARSON ET AL  1,791,426
PROCESS AND APPARATUS FOR CONTINUOUSLY SEPARATING
GRANULAR AND PULVERULENT MATERIALS
Filed Sept. 8, 1928  2 Sheets-Sheet 2
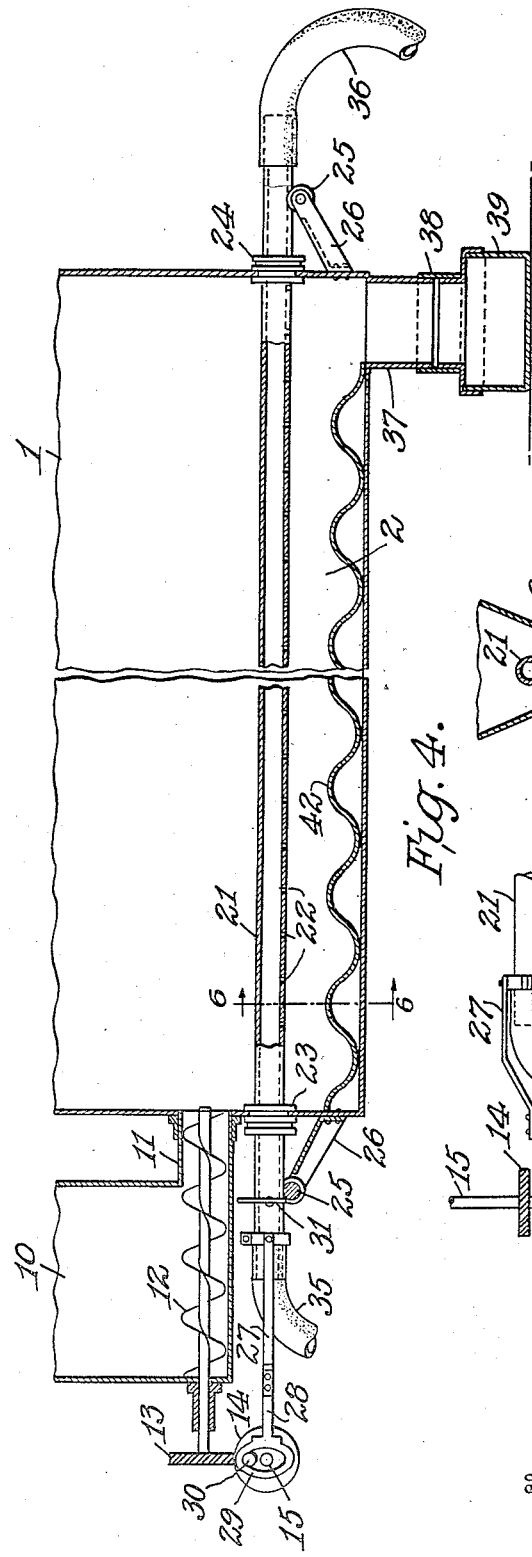
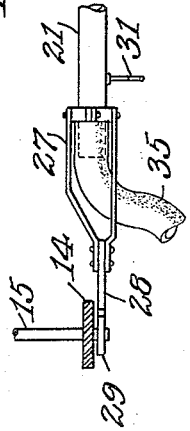
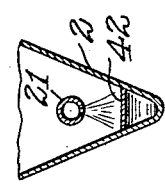
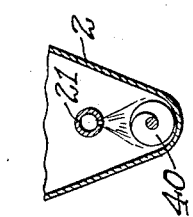
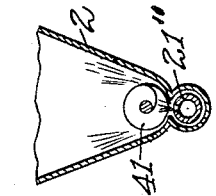
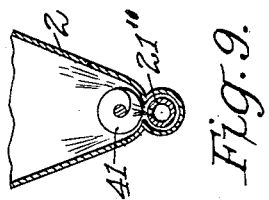
Inventors
Joseph C. Pearson
Frank A. Hitchcock
By G. C. Waldrop.
Attorney Patented Feb. 3, 1931

1,791,426

UNITED STATES PATENT OFFICE

JOSEPH C. PEARSON, OF ALLENTOWN, PENNSYLVANIA, AND FRANK A. HITCHCOCK, OF WASHINGTON, DISTRICT OF COLUMBIA

PROCESS AND APPARATUS FOR CONTINUOUSLY SEPARATING GRANULAR AND PULVERULENT MATERIALS

Application filed September 8, 1928. Serial No. 304,726.

This invention relates to process and apparatus for continuously separating granular and pulverulent material, for example, silica, although applicable to other granular and pulverulent materials.

The primary object of the invention is to provide an apparatus and process which effects thorough, efficient, rapid, definite and continuous separation of the material.

A further object of the invention is to provide an apparatus capable of accurately separating, within narrow limits, material in a finely divided state according to definite particle size.

A still further object of the invention is to provide an apparatus capable of being regulated so that the maximum size of the fine particle removed is definitely and accurately controlled.

A still further object of the invention is to provide an efficient distribution of the material being separated relative to the entering fluid in such a manner that a uniformity of the quantity of the material in the presence of the fluid currents throughout the apparatus can be maintained so that a high degree of purity and fineness of particles can be attained.

A still further object of the invention is to provide an apparatus wherein a fluid current is employed to effect separation of the fine from the coarse particles, and to also utilize such current to convey the heavier particles out of the apparatus simultaneously with the discharge of the fines.

The invention has further and other objects which will be later set forth and manifested in the course of the following description.

In the drawings:—

Fig. 4 is an enlarged vertical sectional view partly in elevation of the separating chamber and associated parts;

Fig. 5 is a detail view in top plan of the means for reciprocating the fluid conduit;

Fig. 6 is a sectional view of the lower portion of the separating chamber on line 6—6 of Fig. 4, and Figs. 7, 8 and 9 are views similar to Fig. 6 of modified forms of the apparatus.

Figure 1:
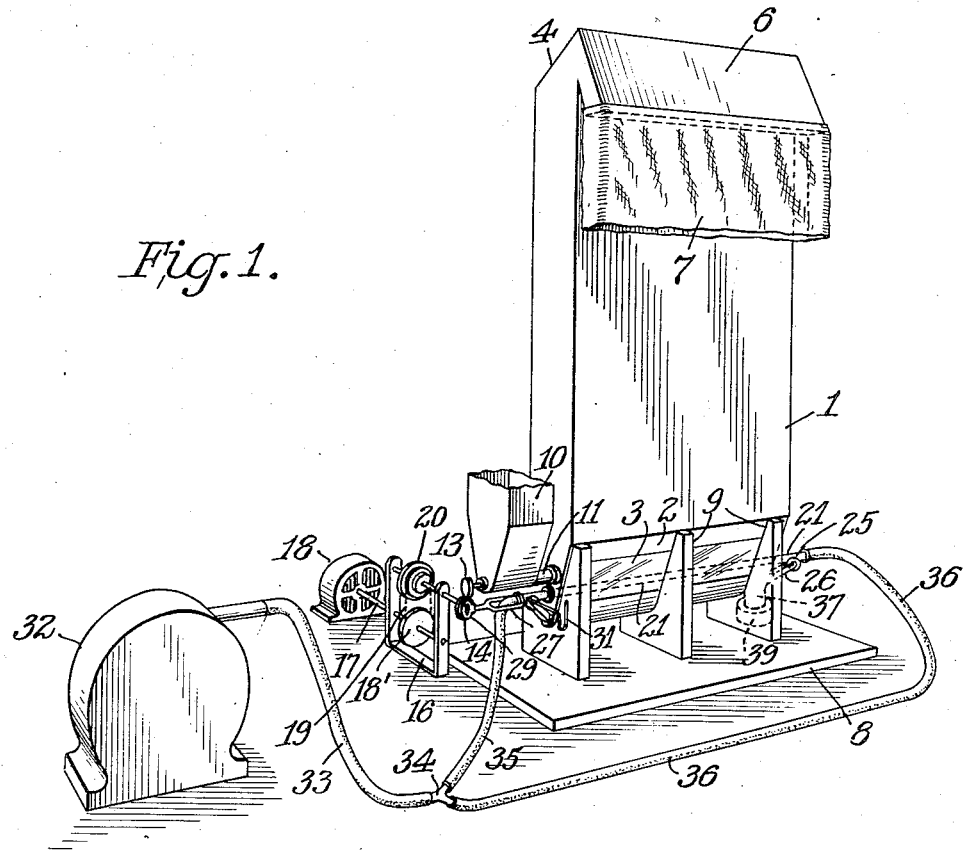
Fig. 1 is a perspective view of the invention.
Figure 2:
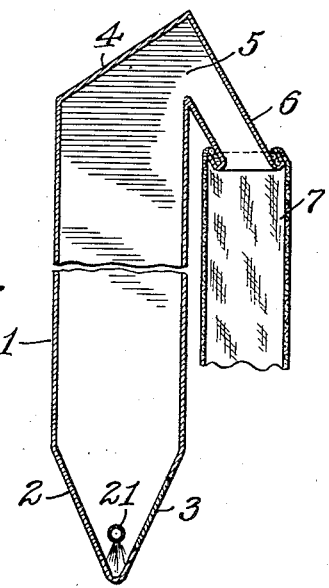
Fig. 2 is a vertical sectional view of the stack or flue.
Figure 3:
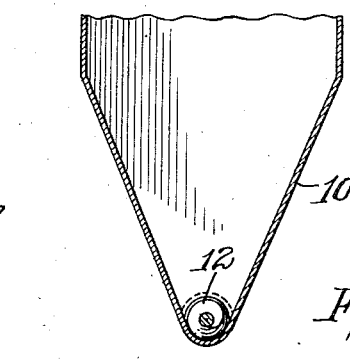
Fig. 3 is a like view of the feed box or hopper.

In proceeding in accordance with the present invention, a flue 1 is employed which at its lower portion is provided with a separating chamber 2, which latter is of substantially V-cross-section, one or both of the sides of which may be provided with a glass panel 3, in order that the separating action may be viewed from the exterior and the air pressure accordingly controlled to effect maximum separating results. The top 4 of the flue is inclined so as to form a constricted outlet passage 5, which latter communicates with a discharge spout 6, the latter being formed to have a bag 7, preferably of cotton flannel detachably applied thereto for the purpose of collecting the fine particles of the material being separated. By virtue of the constricted passage 5, the velocity of the fluid current from conduit 21, later to be referred to, is increased in this area, thereby facilitating and hastening the removal of the fine particles from the upper region of the flue. The flue as shown, may be supported upon a base 8 equipped with standards 9 as depicted in Fig. 1. A feed box or hopper 10 is adjacent to the flue and communicates therewith through a pipe 11, the feed box or hopper being equipped with a worm or screw conveyor 12 driven by helical gears 13 and 14, the gear 13 being carried by the conveyor shaft while the gear 14 is mounted on a shaft 15 journaled in a U-shaped standard 16. A shaft 17 is driven by a motor 18 and carries a pulley 18' which latter through a belt 19 drives a pulley 20 on the shaft 15. Although not shown, it is to be understood that various means may be employed to feed the material and regulate the rate of the feed.

A fluid conduit 21 is disposed within the separating chamber 2 and is provided with outlet openings or perforations 22 which latter in the preferred form of the invention face downward so as to direct the fluid current in a corresponding direction. As shown in Fig. 4, the conduit 21 extends through the walls of the flue and is mounted for reciprocal movement therein. Stuffing boxes 23 and 24 are provided for the conduit 21 and are connected to the walls of the flue. In order to support the conduit for free reciprocal movement, rollers 25 carried by brackets 26 may be employed, the brackets being secured to the walls of the flue while the rollers provide a sliding support for the conduit. In order to effect reciprocation of the conduit, various means may be employed. In the preferred form, conduit 21 has one end of a yoke 27 attached thereto, the opposite end of the yoke being connected to a pitman 28. The pitman has an open cam 29 affixed thereto, within which operates a projection 30 carried by the helical gear 14. A gauge 31 may be employed in order that the fluid pressure within the conduit may be readily determined. Thus with calibration, the pressure within the conduit will indicate the quantity of fluid delivered from the outlets 22 and consequently the velocity of the fluid in the flue which in turn determines the limiting particle size of the separated product.

When the material to be separated has a large percentage of fine particles compared to the coarse particles, its passage through the working chamber 2 is retarded by baffles 42, thus exposing it a longer period of time to the action of the fluid current from each of the perforations 22. A blower 32 is employed and may be connected in any suitable manner by a hose to either or both ends of conduit 21. In the preferred manner as shown particularly in Fig. 1, blower 32 has a hose 33 leading therefrom, to the outer end of which is connected a hollow Y-shaped coupling 34. One end of the coupling has one end of a branch hose 35 connected thereto, the opposite end of which branch hose is connected to the adjacent end of conduit 21. A similar branch hose 36 is connected at one end to the other branch of the coupling 34 and at its opposite end is connected to the other end of the conduit 21.

A discharge pipe 37 is connected to the bottom of the working chamber 2 opposite the feed box or hopper 10 and is provided with a vertical sliding sleeve 38, the latter being formed to fit over the top of a container 39 in which latter the coarse particles are received.

In operation it will be seen that the fluid from the blower is divided into two streams which latter pass through the branch hose 35 and 36, in other words, the fluid stream from the blower is divided and enters each end of the conduit 21 so as to maintain an equalized pressure within the latter. The motor 18 being set in operation and the silica or other material being received in the feed box or hopper 10, it will be seen that the conveyor 12 will be driven through the gears 13 and 14 to feed the material into the separating chamber 2 and at the same time rotation of the gear 14 will cause the pin or projection 30 thereof to operate within the cam 29 thereby reciprocating the yoke 27 and therewith the conduit 21. The material entering the separating chamber will gravitate to the bottom of the chamber, where it will be encountered by the fluid jets from the perforations 22 of the conduit with the result that the fine particles will be conveyed upwardly by the fluid current which latter impinges downwardly upon the material and moves the finer portions upwardly through the flue and into the bag 7 and distributes the remaining material throughout the separating chamber. At the same time, the reciprocal movement of the conduit 21 will further facilitate a gradual movement of the coarse particles, which latter are too heavy to be carried upwardly by the fluid currents, toward the outlet pipe 37 whereupon such coarse particles will enter the container 39. It is particularly to be noted that the material before it can enter the discharge pipe 37, must traverse the entire length of the separating chamber and is subjected to the action of the fluid currents from the conduit 21 throughout the entire length of the chamber 2, thus assuring not only thorough and definite removal of the fines, but also expeditious continuous removal which occurs simultaneously with the movement of the mass of the coarse particles to the discharge pipe 37.

Further it should be noted that the rate of feeding the material to the working chamber can be regulated to the desired number of reciprocations of the conduit by means of the driving mechanism and that the passage of the material through the working chamber can be regulated by means of the baffles so that a pure, continuous and uniform separation can be obtained.

In Fig. 7 of the drawings, a modified form of the invention is illustrated and wherein the fluid outlets of the conduit 21' face upwardly.

In Fig. 8 a further modified form of the invention is illustrated and wherein a conveyor 40 is utilized, which latter is disposed beneath the fluid conduit 21 and may be operated in any suitable manner to convey the coarse particles to the outlet 37 with or without reciprocation of the conduit 21.

In Fig. 9 of the drawings, a still further modified form of the invention is depicted and wherein a conveyor 41 is disclosed and which is located above the fluid conduit 21''.

What is claimed is:—

1. In an apparatus for separating granular and pulverulent material, a flue having an outlet at its upper portion, a separating chamber at the bottom of the flue of substantially V-cross-section having an outlet, a reciprocal fluid conduit extending lengthwise of the said chamber and having fluid outlets, means for supplying gaseous fluid under pressure having separate connections with the ends of the conduit, material feeding means communicating with the chamber and means for operating the feeding means and for reciprocating the conduit.

2. In an apparatus for separating granular and pulverulent material, a flue having an outlet at its upper portion, a separating chamber at the bottom of the flue of substantially V-cross-section having an outlet, means to continuously feed the material into the chamber, a reciprocal fluid conduit extending through said chamber and having fluid outlets, means for supplying gaseous fluid under pressure having separate connections with the ends of the conduit and means to reciprocate the conduit.

3. In an apparatus for separating granular and pulverulent material, a flue having an outlet at its upper portion, an elongated separating chamber at the bottom of the flue having an impervious bottom and an outlet, means to continuously feed the material into the chamber, a reciprocal fluid conduit adjacent to the chamber and extending along the length thereof and having fluid outlets directed downwardly towards the chamber bottom, means to supply gaseous fluid under pressure to the conduit and means to reciprocate the conduit thereby to cause progressive movement of the particles remaining in the chamber into the outlet thereof.

4. In an apparatus for separating granular and pulverulent material, a flue having an outlet and having an elongated separating chamber provided with an impervious bottom and with an outlet, and means independent of the chamber to supply gaseous fluid into and uniformly distribute the same throughout the length of the chamber against material in said chamber whereby to cause the fine particles to be moved into the flue outlet and to cause the particles remaining in the chamber to be moved along the bottom and into the outlet.

5. In an apparatus for separating granular and pulverulent material, a flue having an outlet and having an elongated separating chamber provided with an impervious bottom and with an outlet and means to subject the material in the chamber to downwardly projected gaseous fluid under pressure uniformly distributed throughout the length of the chamber to cause the coarse particles to be repeatedly subjected to the projected fluid and be moved along said bottom and into the outlet thereof and the fine to be moved upwardly into the flue outlet, and means connected to the flue outlet for collecting said fine particles.

6. In an apparatus for separating granular and pulverulent material, a flue having an outlet and having an elongated separating chamber provided with a bottom and with an outlet, means for projecting a current of gaseous fluid into and uniformly distributing the same throughout the length of the separating chamber to move the fine particles through the flue outlet and subject the remaining particles to repeated fluid impact and move the same along the bottom into the outlet of the separating chamber, means to supply said fluid at uniform predetermined pressure to maintain uniformity of the particles passing through the flue outlet, and means for collecting the fine particles passing through the flue outlet.

7. In an apparatus for continuously separating granular and pulverulent material, a flue having an outlet and having a horizontally narrow and elongated separating chamber provided with an impervious bottom and with an outlet, means for feeding material into the chamber, a reciprocal fluid conveying conduit having means for delivering air under pressure downwardly to the material throughout the length of the chamber, means for collecting the fine material passing through the flue outlet and means for maintaining a definite relation between feeding of the material and the reciprocation of the fluid conduit whereby the accuracy of the separation is controlled.

8. The hereindescribed process of separating granular and pulverulent material which resides in introducing and confining the material in a definite region having a confining bottom and subjecting same to the action of a gaseous fluid under pressure substantially uniformly distributed throughout the length of said region, so as to cause separation and elevation of the fine from the heavier particles and synchronously therewith progressive movement and repeated fluid impact of the heavier particles along the bottom to a point remote from said region, and collecting the fine particles elevated.

9. The hereindescribed process of separating granular and pulverulent material which resides in introducing and confining the material in a definite region having a confining bottom and in subjecting the same to the impact of a gaseous fluid under predetermined pressure substantially throughout the extent of such region so as to cause separation of the fine from the heavier particles by moving the fine upwardly and the heavier particles along the bottom out of the region, effecting the movements solely by the action of the fluid, and collecting the fine particles elevated.

10. The hereindescribed process of separating granular and pulverulent material which resides in introducing and confining the material in a definite region having a confining bottom and in subjecting the same to the impact of a gaseous fluid under predetermined pressure adapted to cause upward movement of the fine particles and synchronously therewith repeated fluid impact causing progressive horizontal ejecting movement of the coarse particles along the bottom of and out of said region and complete detachment of the fine from the coarse, and collecting the fine particles elevated.

11. The hereindescribed process of separating granular and pulverulent material which resides in introducing and confining the material in a definite region having a confining bottom and in subjecting same to the action of a downwardly projected gaseous fluid under predetermined pressure so as to cause upward movement of the fine particles and in simultaneously subjecting to repeated fluid impact and moving the heavier particles along the bottom and out of the said region, and collecting the fine particles elevated.

12. The hereindescribed process of separating granular and pulverulent material which resides in introducing and confining the material in a region of relative narrow width and considerable length and having an impervious bottom and in then repeatedly subjecting the material to the action of a gaseous fluid under uniform pressure throughout substantially the length of the bottom so as to cause upward movement of the fine particles out of the region, and progressively moving the heavier material solely by the action of the fluid, and collecting the fine particles elevated.

13. The hereindescribed process of separating granular and pulverulent material which resides in introducing, supporting and confining the material in a relatively long region of relative narrow width and of substantially V-shape in vertical cross section and in then subjecting the material repeatedly to the action of a gaseous fluid under uniform and predetermined pressure throughout substantially the length of the region so as to cause a separation and also a distribution of the material throughout substantially the length of the region by upward movement of the fines and longitudinal movement of the coarse along the bottom of the V-shaped region solely by the action of said fluid, and collecting the fine particles elevated.

14. In an apparatus for separating granular and pulverulent materials, an elongated flue having a lower chamber V-shaped in vertical section and an upper narrow chamber substantially uniform in vertical section and having an outlet, means to feed material into one end of the lower chamber, and means to supply gaseous fluid under predetermined pressure distributed uniformly in downwardly impinging relation to the material in the lower chamber, and means for collecting the fine material elevated by the fluid.

15. In an apparatus for separating granular and pulverulent materials, an elongated flue having a lower chamber V-shaped in vertical section and an upper narrow chamber substantially uniform in vertical section and having an outlet, means to feed material into one end of the lower chamber, and means to supply gaseous fluid under predetermined pressure distributed uniformly in vertically impinging relation to the material in the lower chamber to elevate same, and means for collecting the fine particles elevated.

16. The hereindescribed process of separating granular and pulverulent materials, which resides in introducing and confining the material in a longitudinally extending narrow region having a vertically expanding lower portion and a portion thereabove of substantially uniform horizontal dimension and in subjecting same repeatedly to the action of a gaseous fluid under uniform pressure so as to cause separation of the fine from the heavier particles by elevating same and synchronously therewith progressive movement of the heavier particles to a point remote from said region and collecting the fine particles elevated.

17. The hereindescribed process of separating granular and pulverulent materials, which resides in introducing and confining the material in a longitudinally extended narrow region having an upwardly expanding lower portion and a portion thereabove of substantially uniform horizontal dimension and in subjecting same repeatedly to the action of a gaseous fluid directed downwardly under uniform pressure so as to cause separation of the fine from the heavier particles by elevating same and synchronously therewith progressive movement of the heavier particles to a point remote from said region and collecting the fine particles elevated.

18. The hereindescribed process of separating granular and pulverulent materials, which resides in introducing and confining the material in a relatively long and narrow region and in impinging a gaseous fluid under predetermined pressure distributed uniformly throughout the length of the region against the material to effect teetering action and complete separation of the fines from the coarse, and collecting the fines so separated.

In testimony whereof, we affix our signatures, August 31, 1928.

JOSEPH C. PEARSON.
FRANK A. HITCHCOCK.